US010253758B2

United States Patent
Tyber et al.

(10) Patent No.: US 10,253,758 B2
(45) Date of Patent: Apr. 9, 2019

(54) SYSTEM AND METHOD FOR OPTIMIZING WIND FARM PERFORMANCE

(71) Applicant: General Electric Company, Schenectady, NY (US)

(72) Inventors: Steven Jay Tyber, Rexford, NY (US); Jianhui Chen, Dublin, CA (US); Scott Charles Evans, Burnt Hills, NY (US); Kiersten Marie Ralston, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 650 days.

(21) Appl. No.: 14/493,455

(22) Filed: Sep. 23, 2014

(65) Prior Publication Data

US 2016/0084224 A1 Mar. 24, 2016

(51) Int. Cl.
 *F03D 7/04* (2006.01)
 *G05B 15/02* (2006.01)
 *F03D 17/00* (2016.01)
 *F03D 9/25* (2016.01)
 (Continued)

(52) U.S. Cl.
 CPC ............. *F03D 7/048* (2013.01); *F03D 9/257* (2017.02); *F03D 17/00* (2016.05); *G05B 15/02* (2013.01); *F03D 15/10* (2016.05); *F03D 80/70* (2016.05); *F05B 2270/335* (2013.01); *Y02E 10/72* (2013.01)

(58) Field of Classification Search
 USPC ....................................................... 700/287
 See application file for complete search history.

(56) References Cited

U.S. PATENT DOCUMENTS 7,941,304 B2  5/2011 Gundling
8,050,899 B2  11/2011 Gignuere et al.
8,295,987 B2  10/2012 Gadre et al.
(Continued)

FOREIGN PATENT DOCUMENTS

EP  1571746 A1  9/2005
EP  2778405 A2  9/2014
WO  WO 2013/152776 A1  10/2013

OTHER PUBLICATIONS

PCT Search Report and Written Opinion issued in connection with corresponding PCT Application No. PCT/US2015/044538 dated Nov. 4, 2015.

Primary Examiner — Emilio J Saavedra
(74) Attorney, Agent, or Firm — GE Global Patent Operation; Nitin N. Joshi

(57) ABSTRACT

The present disclosure is directed to systems and methods for optimizing power output of a wind farm. The method includes determining baseline loading condition(s) for wind turbines of the wind farm and defining a baseline threshold value for the load sensors. Another step includes identifying at least one wind turbine having at least one load sensor operating below the baseline threshold value. An upgrade is then provided to the identified wind turbine. In response to the upgrade, the method includes determining whether the load sensor of the identified wind turbine continues to operate below the baseline threshold value. The method also includes classifying an additional load sensor(s) of an additional wind turbine with respect to the load sensor of the identified wind turbine to determine whether to provide the additional wind turbine with the upgrade.

21 Claims, 7 Drawing Sheets

(51) Int. Cl.
*F03D 80/70* (2016.01)
*F03D 15/10* (2016.01)

(56) References Cited

U.S. PATENT DOCUMENTS

| | | |
|---|---|---|
| 2009/0192868 A1 | 7/2009 | Rajiv et al. |
| 2010/0274400 A1* | 10/2010 | Ormel .................... F03D 7/043 |
| | | 700/287 |
| 2010/0274401 A1 | 10/2010 | Kjaer et al. |
| 2011/0018271 A1 | 1/2011 | Karikomi et al. |
| 2011/0145277 A1* | 6/2011 | Gadre .................... F03D 17/00 |
| | | 707/769 |
| 2012/0053983 A1 | 3/2012 | Vittal et al. |
| 2013/0166082 A1* | 6/2013 | Ambekar ............... G05B 13/04 |
| | | 700/287 |
| 2013/0184838 A1 | 7/2013 | Tchoryk, Jr. et al. |
| 2015/0118047 A1* | 4/2015 | Yoon .................. F03D 11/0091 |
| | | 416/1 |

* cited by examiner

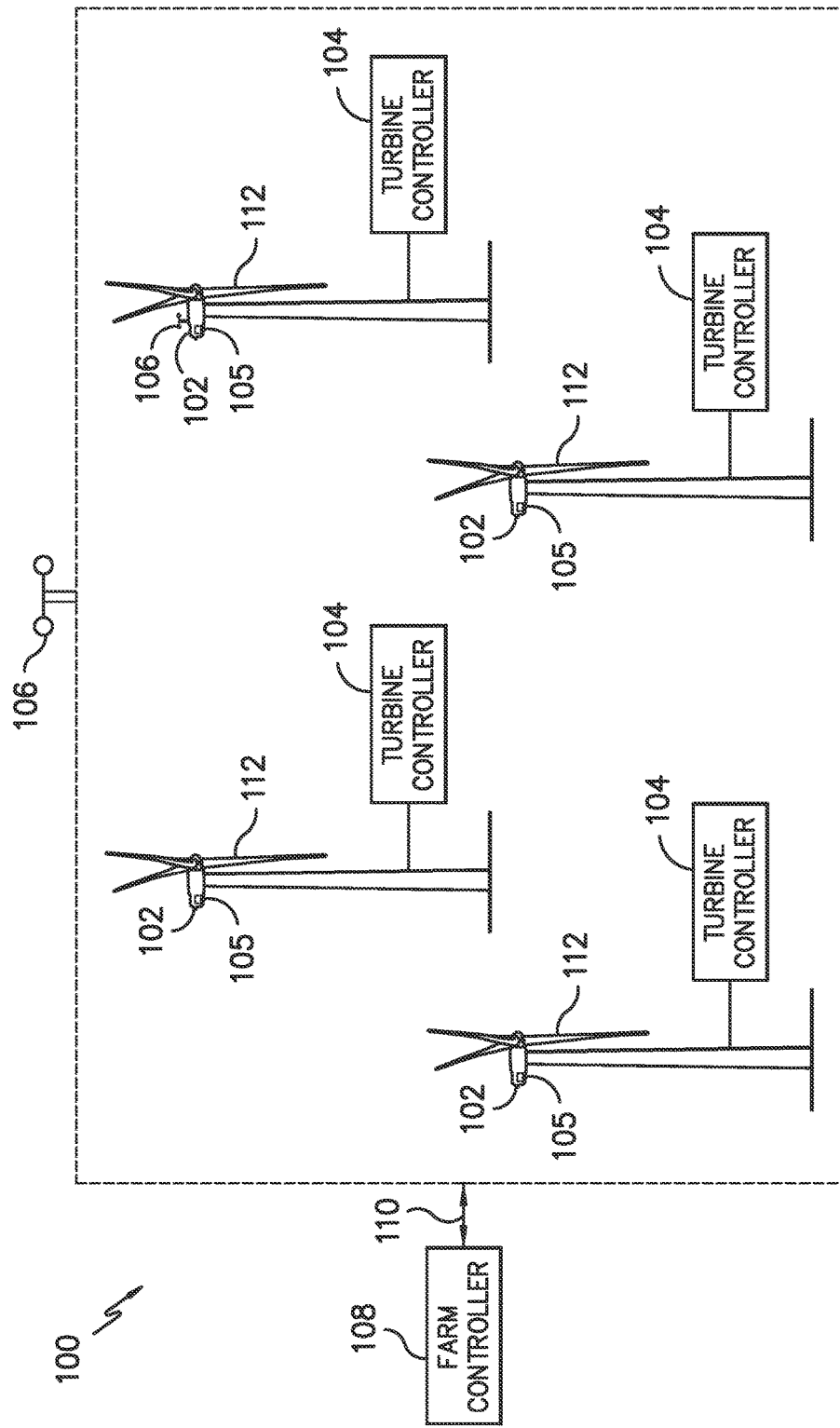
FIG. -1-

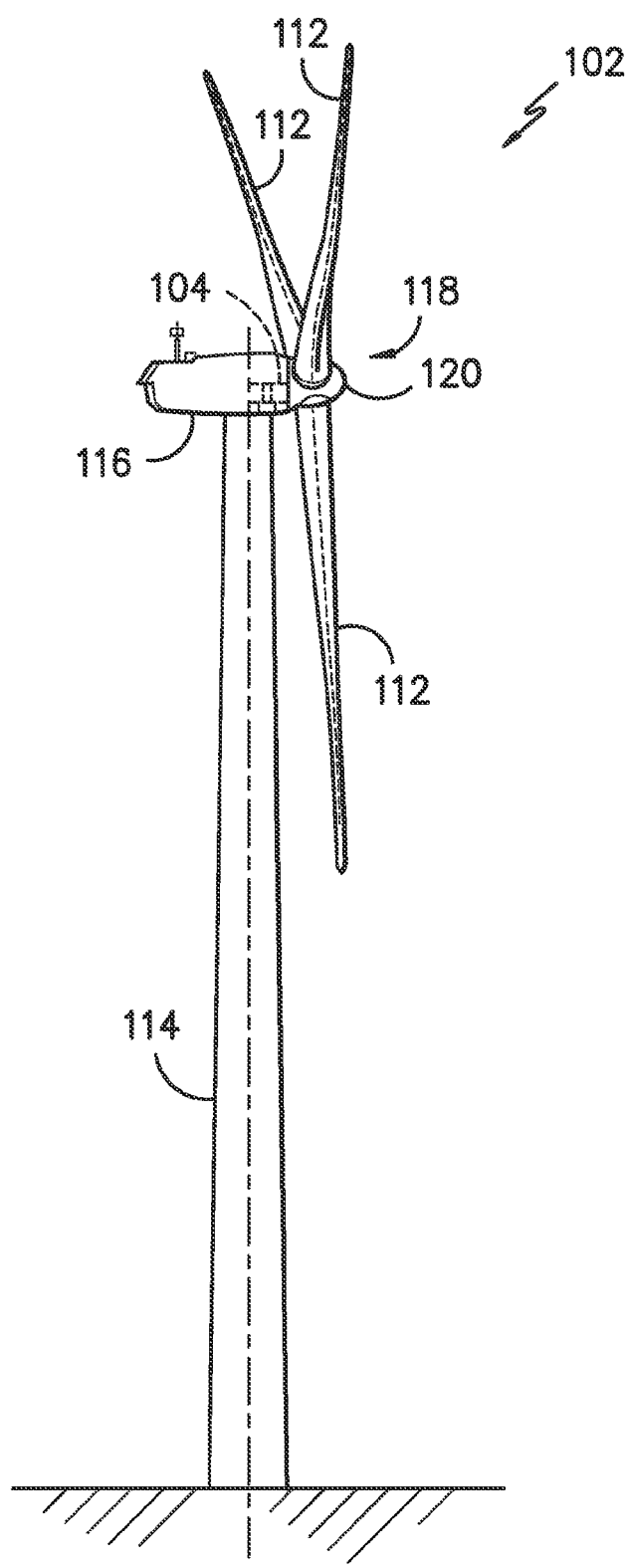
FIG. -2-

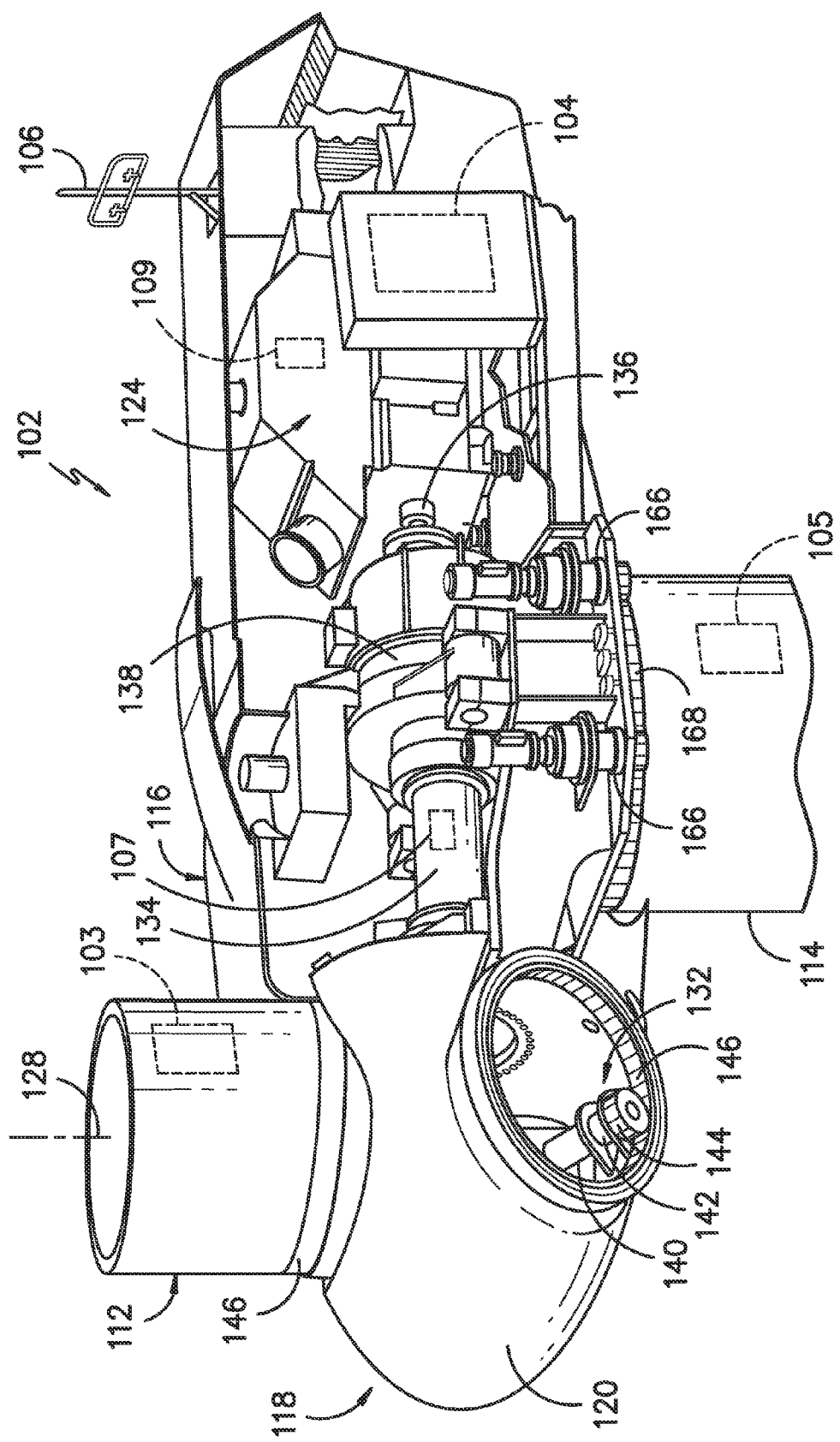
FIG. -3-

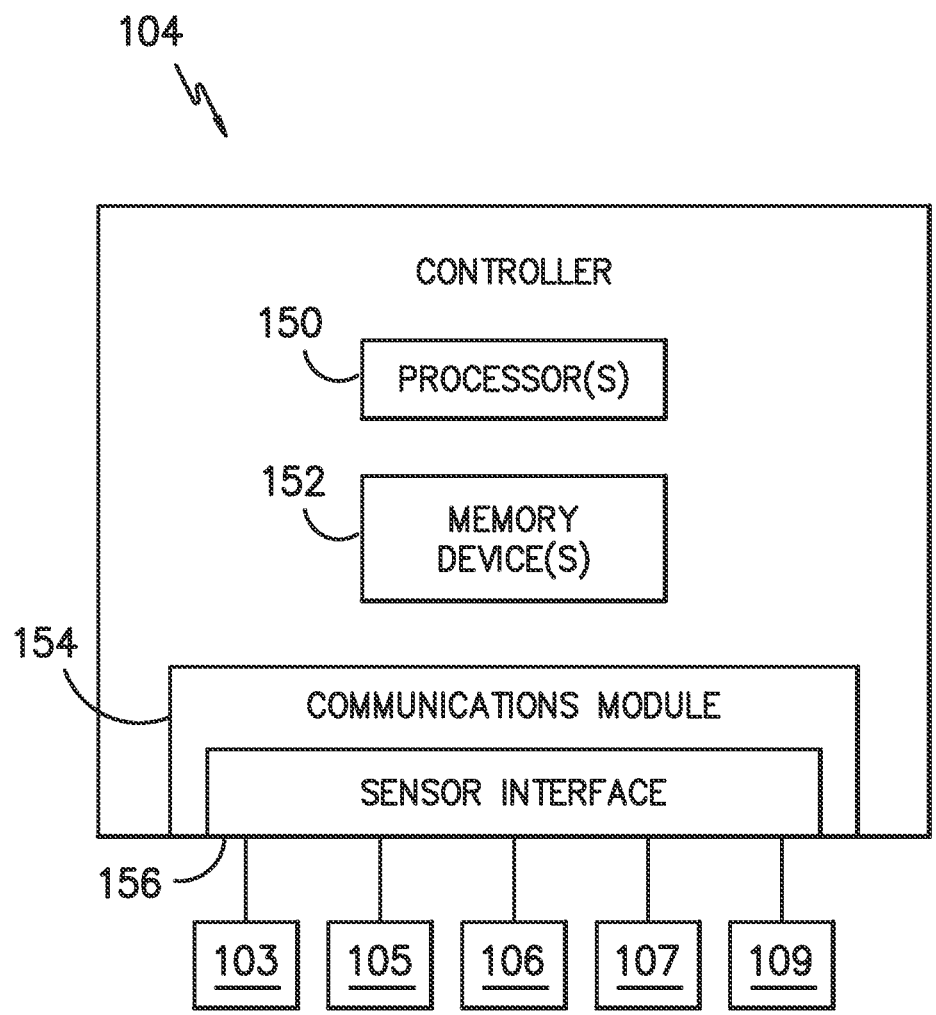
FIG. -4-

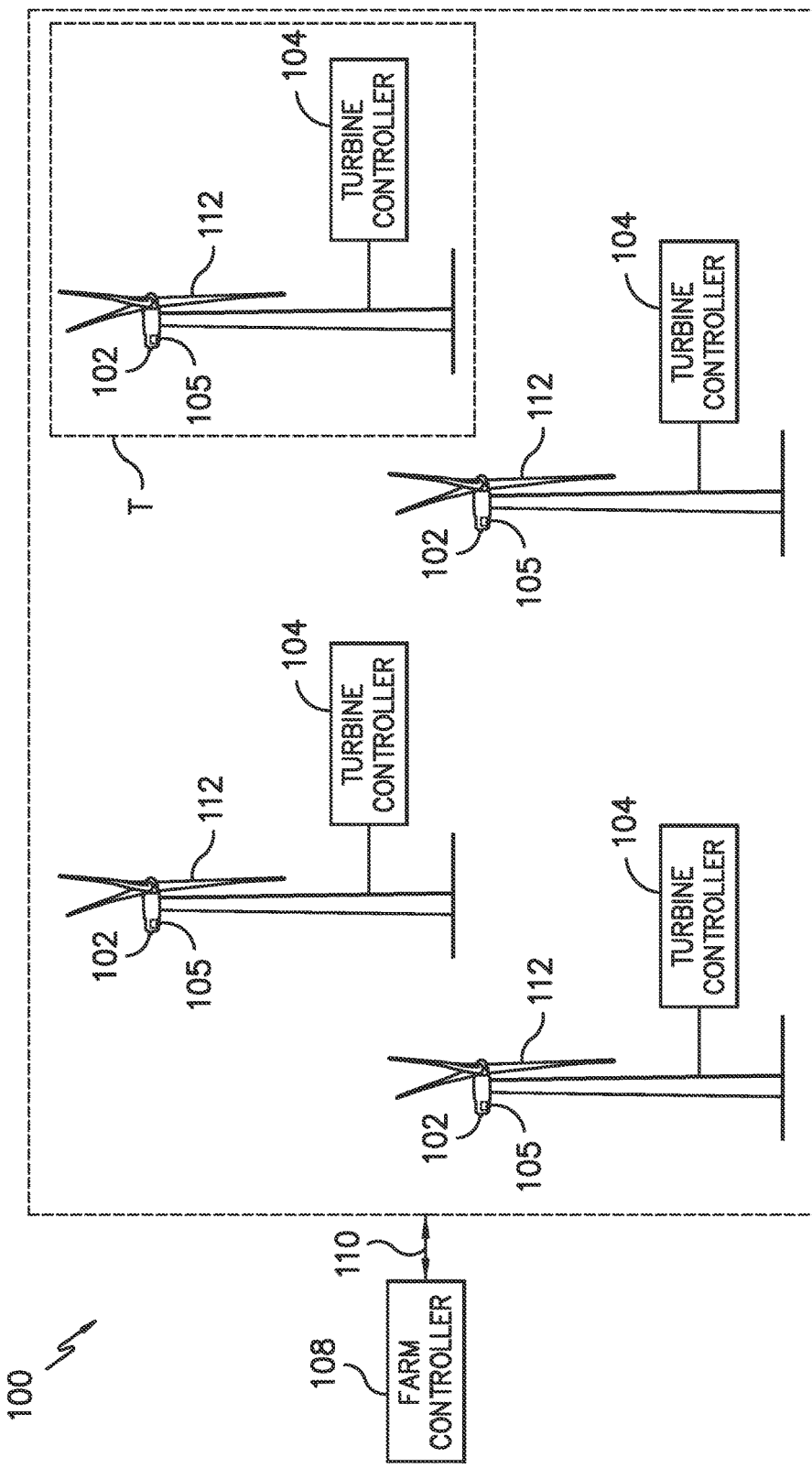
FIG. -5-

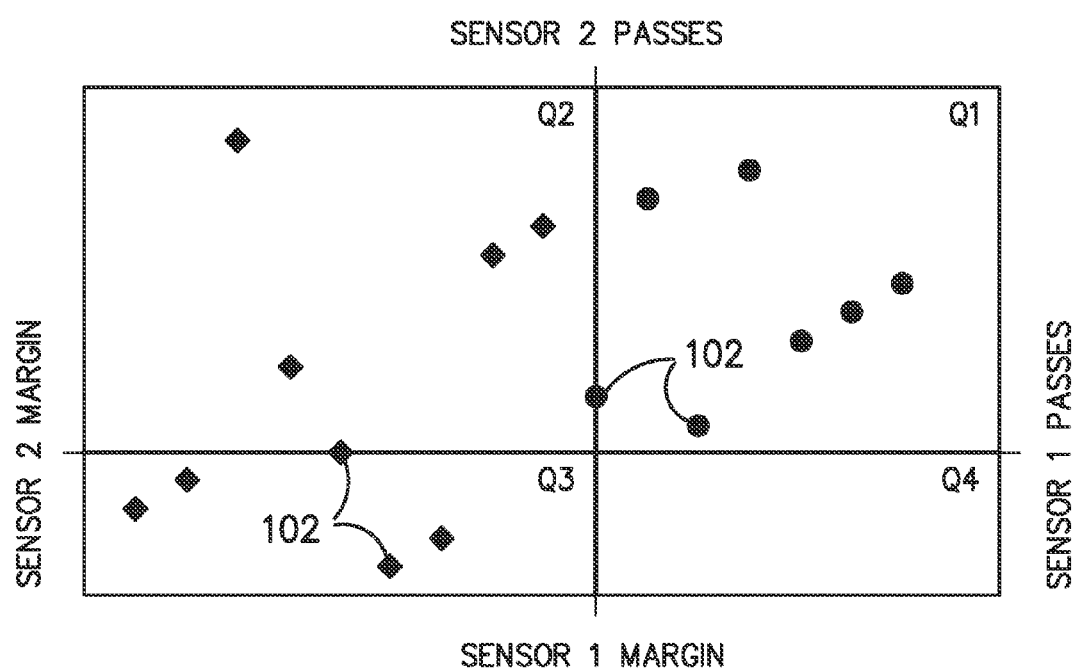
FIG. -6-

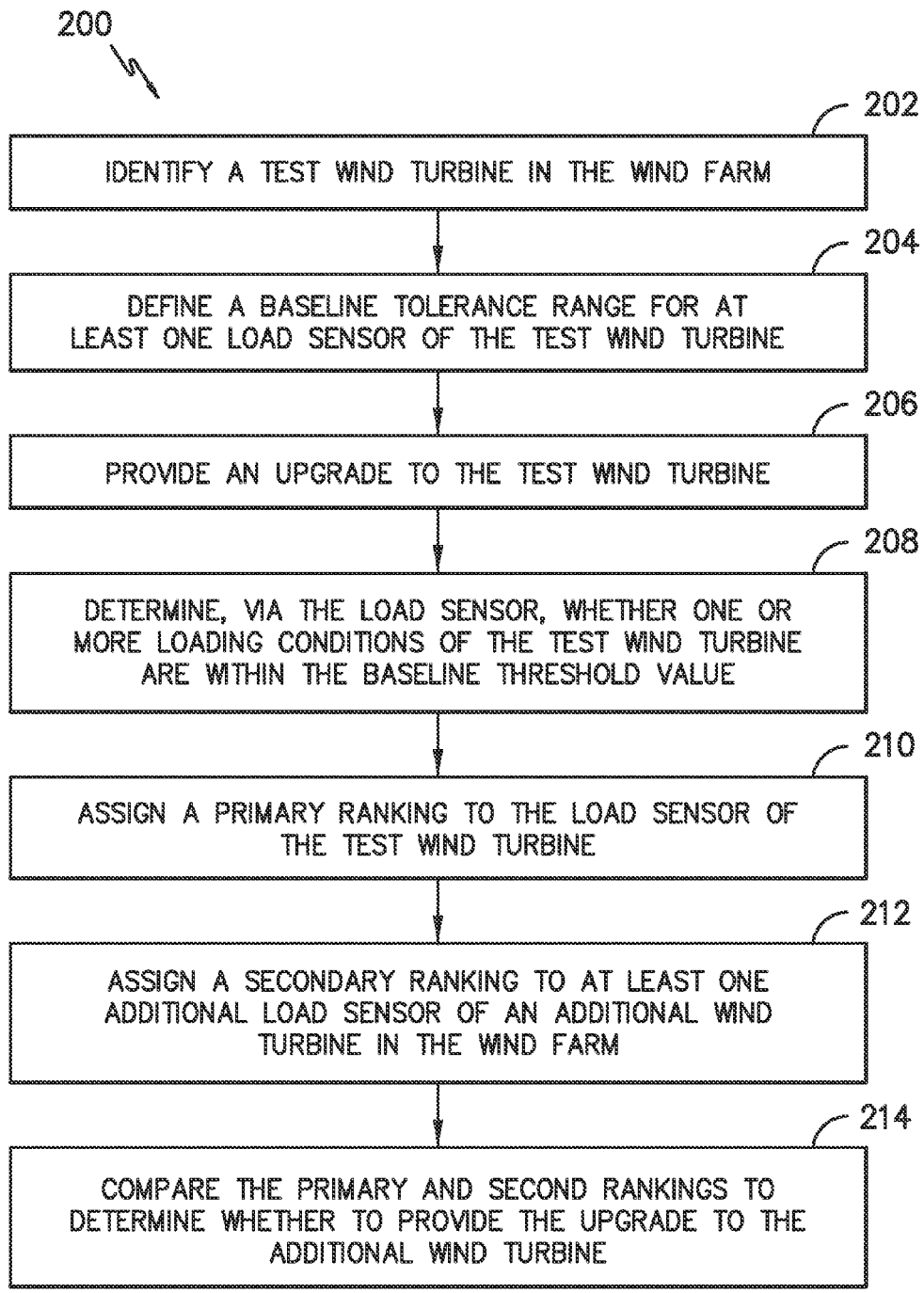
FIG. -7-

SYSTEM AND METHOD FOR OPTIMIZING WIND FARM PERFORMANCE

FIELD OF THE INVENTION

The present disclosure relates generally to wind farms and, more particularly, to systems and methods for optimizing wind farm performance.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided. The correlation of meteorological data with power output allows the empirical determination of a "power curve" for the individual wind turbines.

Typically, in a wind farm, each wind turbine attempts to maximize its own power output while maintaining its fatigue loads within desirable limits. To this end, each turbine includes a control module, which attempts to maximize power output of the turbine in the face of varying wind and grid conditions, while satisfying constraints like sub-system ratings and component loads. Based on the determined maximum power output, the control module controls the operation of various turbine components, such as the generator/power converter, the pitch system, the brakes, and the yaw mechanism to reach the maximum power efficiency.

Often, while maximizing the power output of a single wind turbine, neighboring turbines may be negatively impacted. For example, downwind turbines may experience large wake effects caused by an upwind turbine. Wake effects include reduction in wind speed and increased wind turbulence downwind from a wind turbine typically caused by the conventional operation of upwind turbines (for maximum power output). Because of these wake effects, downwind turbines receive wind at a lower speed, drastically affecting their power output (as power output is proportional to wind speed). Moreover, wind turbulence negatively affects the fatigue loads placed on the downwind turbines, and thereby affects their life (as life is proportional to fatigue loads). Consequently, maximum efficiency of a few wind turbines may lead to sub-optimal power output, performance, or longevity of other wind turbines in the wind farm.

Thus, modern control technologies attempt to optimize the wind farm power output rather than the power outputs of each individual wind turbine.

In addition, there are many products, features, and/or upgrades available for wind turbines and/or wind farms so as to increase power output, e.g. annual energy production (AEP), of the wind farm. As new and improved upgrades become available, it is advantageous to quickly and efficiently determine whether a specific wind turbine of the wind farm can receive the upgrade without, for example, exceeding operating load limits.

For example, some wind farms employ a plurality of load sensors for each wind turbine. Each sensor has an associated margin that indicates whether a particular wind turbine component is operating safely. A farm controller receives data from the load sensors and performs a load analysis for each wind turbine within the wind farm. If the wind turbine passes the load analysis (i.e. each sensor is operating within its margin), then the turbine may receive an upgrade. Such control technologies, however, are very time-consuming, as the load analysis has to be performed for each wind turbine in the wind farm.

Additional wind farm controllers determine whether individual wind turbines can receive an upgrade by approximating loads for each wind turbine using pre-existing wind turbine data, e.g. data stored in one or more look-up tables. Based on the approximation, the farm controller can perform a loads analysis for the most-loaded turbines, rather than all of the wind turbines, so as to reduce the amount of time required to perform the analysis. Such a loads analysis, however, may not be as accurate as performing the loads analysis on each turbine using one more load sensors as described above. In addition, using the most-loaded turbine may be too conservative of an estimate, thereby sacrificing potential gains.

Accordingly, there is a need for improved systems and methods for optimizing wind farm performance that addresses the aforementioned issues.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for optimizing power output of a wind farm. The method includes determining one or more baseline loading conditions for one or more wind turbines of the wind farm, e.g. using pre-existing wind turbine data. Another step includes defining a baseline threshold value for a plurality of load sensors for each of the wind turbines based on the baseline loading conditions. A further step includes identifying at least one wind turbine having at least one load sensor operating below the baseline threshold value and providing an upgrade to the identified wind turbine. In response to the upgrade, the method includes determining whether the load sensor(s) of the identified wind turbine continues to operate below the baseline threshold value. Thus, the method includes classifying at least one additional load sensor of at least one additional wind turbine in the wind farm with respect to the load sensor of the identified wind turbine so as to determine whether to provide the additional wind turbine with the upgrade.

In another aspect, the present disclosure is directed to a method for optimizing power output of a wind farm. The method includes identifying a test wind turbine in the wind farm. Another step includes defining a baseline threshold value for at least one load sensor of the test wind turbine. Still another step includes providing an upgrade to the test wind turbine. The method may also include determining, via the load sensor, whether one or more loading conditions of the test wind turbine are below the baseline threshold value. Additional steps may include assigning a primary ranking to the load sensor of the test wind turbine and assigning a secondary ranking to at least one additional load sensor of an additional wind turbine in the wind farm. Thus, the method also includes comparing the primary and second rankings and determining whether to provide the upgrade to the additional wind turbine based on the comparison.

In yet a further aspect, the present disclosure is directed to a system for optimizing power output of a wind farm. The system includes a plurality of load sensors configured to monitor one or more loading conditions of one or more wind turbines in a wind farm and a farm controller configured to perform one or more operations. The operations include, at least, defining a baseline threshold value for each of the load sensors based on one or more baseline loading conditions, identifying at least one wind turbine having at least one load sensor operating below the baseline threshold value, providing an upgrade to the identified wind turbine, determining whether the at least one load sensor of the identified wind turbine continues to operate below the baseline threshold value in response to the upgrade, and classifying at least one additional load sensor of an additional wind turbine in the wind farm with respect to the load sensor of the identified wind turbine to determine whether to provide the additional wind turbine with the upgrade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind farm according to the present disclosure;

FIG. 2 illustrates a perspective view of one embodiment of a wind turbine according to the present disclosure;

FIG. 3 illustrates a detailed, internal view of one embodiment of a nacelle of a wind turbine according to the present disclosure;

FIG. 4 illustrates a block diagram of one embodiment of a controller of a wind turbine and/or or wind farm according to the present disclosure;

FIG. 5 illustrates a perspective view of one embodiment of a wind farm according to the present disclosure, particularly illustrating an identified test wind turbine;

FIG. 6 illustrates one embodiment of a quadrant diagram according to the present disclosure, particularly illustrating wind turbines that are suitable for receiving an upgrade; and FIG. 7 illustrates a flow diagram of one embodiment of a method of optimizing power output of a wind farm according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and methods for optimizing power output of a wind farm. More specifically, the present disclosure is directed to a system and method for optimizing wind turbine configurations in a wind farm by selecting candidate upgrade configurations which contain a plurality of wind turbines potentially suitable for an upgrade and rapidly assessing mechanical loads of the selected wind turbines to determine eligible turbines for such upgrades. In other words, the present disclosure includes performing a mechanical loads analysis on a plurality of wind turbines to rapidly determine which turbines in the farm are eligible for a particular upgrade, and assigning the upgrades to individual wind turbines.

A wind farm according to the present disclosure generally includes a plurality of wind turbines each having one or more load sensors. Therefore, in one embodiment, the system for optimizing power output of the wind farm is capable of determining one or more baseline loading conditions for the plurality of wind turbines using a data-driven model. Next, the system defines a baseline threshold value for each of the load sensors for each wind turbine in the wind farm based on the baseline loading conditions. Thus, the system can select a test wind turbine having at least one load sensor operating below the baseline threshold value and provide the test wind turbine with an upgrade. In response to providing the upgrade, the system is configured to determine whether the load sensor of the test wind turbine continues to operate below the baseline threshold value via a physics-based model. If so, the system classifies at least one additional load sensor of an additional wind turbine(s) in the wind farm with respect to the load sensor of the test wind turbine to determine whether to provide the additional wind turbine(s) with the upgrade.

For example, in one embodiment, the system may assign a primary ranking to the load sensor of the test wind turbine and secondary rankings to additional load sensors of additional wind turbines in the wind farm. If the secondary ranking of a particular wind turbine is greater than or equal to the primary ranking of the test wind turbine, then the system may provide the upgrade to the particular wind turbine so as to optimize power output of the wind farm. Similar, if the secondary ranking of the particular wind turbine is less than the primary ranking of the test wind turbine, then the system may withhold the upgrade from the particular wind turbine such that maximum allowable loads of the particular wind turbine is not exceeded.

The present disclosure has many advantages not present in the prior art. For example, the present disclosure utilizes approximate loads information of a data-driven model to accelerate a more accurate albeit more time consuming physics-based model. Such a time reduction provides immediate commercial advantages by reducing the duration of a mechanical loads analysis on the wind farm, e.g. potentially from several days to several hours. Moreover, the time reduction allows more aggressive testing of multiple configurations in the wind farm and provides additional benefit over conservative current-day practices. In addition, the present disclosure optimizes the power output of the wind farm, while maintaining fatigue and extreme loads within safe limits.

Referring now to the drawings, FIG. 1 illustrates an exemplary embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Typically, wind turbine arrangement in a wind farm is determined based on numerous optimization algorithms such that AEP is maximized for corresponding site wind climate. It will be understood that any wind turbine arrangement may be implemented, such as on uneven land, without departing from the scope of the present disclosure.

In addition, it will be understood that the wind turbines 102 of the wind farm 100 may have any suitable configuration, such as for example, as shown in FIG. 2. As shown, FIG. 2 illustrates perspective view of one embodiment of the wind turbine 102 according to the present disclosure. The wind turbine 102 includes a tower 114 with a nacelle 116 mounted thereon. A rotor 118 includes a rotatable hub 120 having a plurality of rotor blades 112 mounted thereon, which is, in turn, connected to a main flange that turns a main rotor shaft 134 (FIG. 3). The wind turbine power generation and control components may also be housed within the nacelle 116 as shown in FIG. 3 and discussed herein. It should be appreciated that the wind turbine 102 of FIG. 1 is provided for illustrative purposes only. Thus, one of ordinary skill in the art should understand that the invention is not limited to any particular type of wind turbine configuration.

Referring now to FIG. 3, a detailed, internal view of one embodiment of the nacelle 116 of the wind turbine 102 shown in FIG. 2 is illustrated. As shown, a generator 124 may be disposed within the nacelle 116. In general, the generator 124 may be coupled to the rotor 118 for producing electrical power from the rotational energy generated by the rotor 118. For example, as shown in the illustrated embodiment, the rotor 118 may include a rotor shaft 134 coupled to the hub 120 for rotation therewith. The rotor shaft 134 may, in turn, be rotatably coupled to a generator shaft 136 of the generator 124 through a gearbox 138. As is generally understood, the rotor shaft 134 may provide a low speed, high torque input to the gearbox 138 in response to rotation of the rotor blades 112 and the hub 120. The gearbox 138 may then be configured to convert the low speed, high torque input to a high speed, low torque output to drive the generator shaft 136 and, thus, the generator 124.

Each rotor blade 112 may also include a pitch adjustment mechanism 132 configured to rotate each rotor blade 112 about its pitch axis 128, a yaw mechanism 166, and a wind sensor 106 that work cohesively to swivel and align the rotor blades 112 in line with the wind direction. Thus, during operation, the rotor blades 112 may face in a substantially similar direction, such as the incoming wind direction. Further, each pitch adjustment mechanism 132 may include a pitch drive motor 140 (e.g., any suitable electric motor), a pitch drive gearbox 142, and a pitch drive pinion 144. In such embodiments, the pitch drive motor 140 may be coupled to the pitch drive gearbox 142 so that the pitch drive motor 140 imparts mechanical force to the pitch drive gearbox 142. Similarly, the pitch drive gearbox 142 may be coupled to the pitch drive pinion 144 for rotation therewith. The pitch drive pinion 144 may, in turn, be in rotational engagement with a pitch bearing 146 coupled between the hub 120 and a corresponding rotor blade 112 such that rotation of the pitch drive pinion 144 causes rotation of the pitch bearing 146. Thus, in such embodiments, rotation of the pitch drive motor 140 drives the pitch drive gearbox 142 and the pitch drive pinion 144, thereby rotating the pitch bearing 146 and the rotor blade 112 about the pitch axis 128. Similarly, the yaw drive mechanism(s) 166 may be communicatively coupled to the controller 104, with each yaw drive mechanism(s) 166 being configured to change the angle of the nacelle 116 relative to the wind (e.g., by engaging a yaw bearing 168 of the wind turbine 102).

In addition, the wind turbine 102 may also include one or more sensors 103, 105, 106, 107, 109 configured to monitor various operating, wind, and/or loading conditions of the wind turbine 102. The term "loading condition" as used herein may refer to any load acting on any wind turbine component. For instance, the one or more sensors may include blade sensors 103 for monitoring loads acting on the rotor blades 112; generator sensors 109 for monitoring loads acting on the generator 124, the torque, the rotational speed, the acceleration and/or the power output of the generator 124; wind sensors 106 for monitoring the one or more wind conditions; and/or shaft sensors 107 for measuring the loads acting on the rotor shaft 134 and/or the rotational speed of the rotor shaft 134. Additionally, the wind turbine 102 may include one or more tower sensors 105 for measuring the loads transmitted through the tower 114 and/or the acceleration of the tower 114. In various embodiments, the sensors 103, 105, 106, 107, 109 may be any one of or combination of the following: an accelerometer, a strain gauge, a pressure sensor, a vibration sensor, a Miniature Inertial Measurement Unit (MIMU), a camera system, a Sonic Detection and Ranging (SODAR) sensor, a Light Detecting and Ranging (LIDAR) sensor, or similar. Of course, the wind turbine 102 may further include various other suitable sensors for measuring any other suitable loading and/or operating conditions of the wind turbine 102.

As shown generally in the figures, each wind turbine 102 of the wind farm may also include a turbine controller 104 communicatively coupled to a farm controller 108. Moreover, in one embodiment, the farm controller 108 may be coupled to the turbine controllers 104 through a network 110 to facilitate communication between the various wind farm components. Further, each turbine controller 104 is configured to control the operation of an individual wind turbine 102 such that the AEP of the wind farm 100 is optimized.

Referring particularly to FIG. 4, there is illustrated a block diagram of one embodiment of suitable components that may be included within the turbine controller 104 and/or the farm controller 108 in accordance with aspects of the present disclosure. As shown, the controller 104 may include one or more processor(s) 150 and associated memory device(s) 152 configured to perform a variety of computer-implemented functions (e.g., performing the methods, steps, calculations and the like and storing relevant data as disclosed herein). Additionally, the controller 104 may also include a communications module 154 to facilitate communications between the controller 104 and the various components of the wind turbine 102. Further, the communications module 154 may include a sensor interface 156 (e.g., one or more analog-to-digital converters) to permit signals transmitted from the sensors 103, 105, 106, 107, 109 (such as loading and/or operating conditions) to be converted into signals that can be understood and processed by the processors 150. It should be appreciated that the sensors 103, 105, 106, 107, 109 may be communicatively coupled to the communications module 154 using any suitable means. For example, as shown, the sensors 103, 105, 106, 107, 109 are coupled to the sensor interface 156 via a wired connection. However, in other embodiments, the sensors 103, 105, 106, 107, 109 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller 104 to perform various functions as described herein. Moreover, the network 110 that couples the farm controller 108, the turbine controllers 104, and the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the wind turbines 102 and the farm controller 108 in near real time.

In addition, the farm controller 108 is configured to obtain data from the wind turbines 102, the sensors 103, 105, 106, 107, 109, and/or other data sources such as turbine empirical models. Employing these inputs, the farm controller 108 may perform numerical optimization and optimize farm-level power output for the wind farm 100. For example, a typical farm controller of a wind farm may be configured to perform a detailed loads analysis for a single wind turbine using a physics-based simulation or an approximate loads analysis via a data-driven model. The computational burden of the physics-based simulation, however, makes it impractical to run for the entire farm and the data-driven model fails to provide the desired accuracy. As such, the farm controller 108 of the present disclosure is configured to perform an improved mechanical loads analysis of the wind turbines 102 that utilizes a data-driven model to guide selection of one or more wind turbines 102 to test with the physics-based model. Further, the wind turbines 102 not tested with the physics-based model are compared against those which have been tested using ranking information provided by the data-driven model. Moreover, the farm controller 108 can utilize the method of the present disclosure to select a set of upgrades for the wind farm 100.

More specifically, the farm controller 108 develops a baseline load estimate for all of the wind turbines 102 in the wind farm 100. For example, in certain embodiments, the farm controller 108 estimates one or more baseline loading conditions for each of the wind turbines 102 of the wind farm 100 prior to any upgrade being provided to the wind turbines 102. For example, in a particular embodiment, the farm controller 108 estimates the baseline loading condition(s) by utilizing one or more look-up tables that contain pre-existing wind turbine data. Alternatively, the farm controller 108 may determine the baseline loading condition(s) using a computer model. In such an embodiment, the computer model may calculate the baseline loading conditions by inputting a plurality of wind turbine data into a series of equations and determining the loading conditions using aerodynamic performance maps and look-up tables.

It should be understood that the pre-existing wind turbine data may include any relevant operating data concerning the wind turbines 102 including but not limited to a pitch angle, generator speed, power output, torque output, air density, temperature, pressure, wind speed, wind peaks, wind turbulence, wind shear, wind direction, or similar. In addition, it should be understood that the baseline loading conditions may be reflective of any load acting on any wind turbine component, including but not limited to one or more of the rotor blades 112, the rotor 118, the hub 120, the nacelle 116, the main shaft 134, the generator 124, the tower 114, the bedplate, the main frame, the generator frame, one or more pitch bearings 146, the yaw bearing 168, the gearbox 138, or any other wind turbine component.

Referring to FIG. 5, each of the wind turbines 102 includes at least one load sensor 105 configured to monitor one or more loads acting on the wind turbine. Thus, once the baseline loading conditions are estimated, the farm controller 108 defines a baseline threshold value for each of the load sensors 105 for each wind turbine 102. Next, the farm controller 108 selects a test wind turbine (e.g. T) based on the load sensors 105 of the test wind turbine T operating below the baseline threshold value and runs a physics-based model thereon to estimate a detailed loads analysis for the test wind turbine T. Thus, the test wind turbine T may be selected based on an initial prediction from the data-driven model that its load sensor 105 is operating below the baseline threshold value for that particular sensor, which is verified by the physics-based model. For example, in certain embodiments, the identification of the test turbine T may be achieved by integer programming. As used herein, "integer programming" refers generally to a mathematical optimization or feasibility program in which some or all of the variables are restricted to be integers. For example, for each untested wind turbine, that farm controller 108 may include an integer program that uses known bound and ranking information to determine the minimum guaranteed number of wind turbines that can be evaluated by testing (i.e. either determined eligible or ineligible). Thus, the test wind turbine T may be determined by choosing the number of wind turbines that provides the maximum guarantee.

In addition, in certain embodiments, identification of the test wind turbine T can be enhanced using regression techniques. For example, previously tested turbines may include a sample (e.g. upper and lower bounds X,Y), where samples are defined by baseline sensor estimates (e.g. from the data-driven model) and their response values (from the physics-based model). This information can be used to predict the outcome of a new physics-based run and improve the guarantee of the test wind turbine T.

After selection of the test wind turbine T, the farm controller 108 provides an upgrade to the test wind turbine T. In certain embodiments, the upgrade(s) may include any suitable upgrade, including but not limited to a software update, a hardware update, one or more rotor-blade add-ons, or similar. In response to the upgrade, the farm controller 108 then determines whether the load sensor(s) 105 of the identified wind turbine continues to operate below the baseline threshold value. If so, the one or more additional load sensor(s) 105 of the remaining wind turbines 102 of the wind farm 100 are classified with respect to the load sensor 105 of the test wind turbine T to determine whether to provide the additional wind turbine with the upgrade.

For example, in various embodiments, the farm controller 108 may provide or assign a primary ranking to the load sensor 105 of the test wind turbine T and a secondary ranking to the additional load sensor(s) 105 of the remaining wind turbines 102 such that each of the secondary rankings may be compared to the primary ranking of the test wind turbine to determine upgrade eligibility. More specifically, if the load sensor 105 of the test wind turbine T fails to operate below the baseline threshold value, then any remaining wind turbine 102 assigned a secondary ranking that is less than or equal to the primary ranking will also fail. Otherwise, if the load sensor 105 of the test wind turbine T passes (i.e. operates below the baseline threshold value), then any remaining wind turbine 102 assigned a secondary ranking that is greater than or equal to the primary ranking will also pass.

For example, FIG. 6 illustrates a plurality of wind turbines 102 plotted on a quadrant diagram that indicates whether each of the wind turbines 102 of the wind farm 100 is suitable for an upgrade. More specifically, all of the wind turbines 102 in quadrant one (i.e. Q1) have sensors that "pass" (i.e. have a ranking that is higher than that of a load sensor of a particular test wind turbine). In particular embodiments, "passing" wind turbines 102 may be identified by maintaining lower and upper bounds for each sensor 105 and updating the baseline threshold value as more tests are run. Such bounds indicate the maximum rank for each failing sensor/load case and the minimum rank of any passing sensor/load case. Similarly, the wind turbines 102 in quadrants two, three, and four one (i.e. Q2, Q3, Q4) "fail" or have load sensors 105 with a ranking that is less than that of a particular test wind turbine. Thus, each of the wind turbines 102 in the wind farm 100 are classified for a particular upgrade until each turbine 102 is known to either fail on some sensor or pass across all sensors. Accordingly, the farm controller 108 is configured to provide an upgrade to any of the remaining wind turbines 102 that have "passing" sensors and withhold the upgrade from those wind turbines 102 which have at least one "failing" sensor in comparison to the load sensor 105 of the test wind turbine T.

In additional embodiments, the farm controller 108 may identify an additional test wind turbine and provide an upgrade to such a wind turbine if the load sensors 105 of the initial test wind turbine T are not operating below the baseline threshold value after receiving the upgrade. The different test wind turbine may then be provided a primary ranking to compare to secondary rankings of the remaining wind turbines 102.

Once the farm controller 108 has determined which of the wind turbines 102 may receive a particular upgrade, the controller 108 may repeat the process to determine a plurality of upgrade configurations for the wind farm 100. As used herein, an "upgrade configuration" includes a selection of wind turbines 102 within the wind farm 100 that are capable of receiving the upgrade. Thus, after determining a plurality of potential upgrade configurations, the farm controller 108 is configured to rank each of the configurations based on power output, e.g. AEP gains. In one embodiment, for example, upgrade configurations are sorted in decreasing order of AEP gains. Thus, in one embodiment, the farm controller 108 can operate the wind farm 100 based on the upgrade configuration with the highest AEP gain. Further, using the method of the present disclosure, each upgrade configuration can be tested and assigned to passing turbines until all turbines have maximized their AEP gains. Such an approach can be parallelized and run on multiple upgrade configurations.

Referring now to FIG. 7, a flow diagram of one embodiment of a method 200 for identifying a test wind turbine in the wind farm is illustrated. As shown, the method 200 includes a step 202 of identifying a test wind turbine in the wind farm. Another step 204 includes defining a baseline threshold value for at least one load sensor of the test wind turbine. In several embodiments, the baseline threshold value may be based on a baseline loads assessment of the wind turbines 102 in the wind farm as determined from pre-existing wind turbine data. At 206, the method 200 includes providing an upgrade to the test wind turbine. At 208, the method 200 includes determining, via the load sensor, whether one or more loading conditions of the test wind turbine are below the baseline threshold value. The method 200 includes assigning a primary ranking to the load sensor of the test wind turbine (step 210) and assigning a secondary ranking to at least one additional load sensor of an additional wind turbine in the wind farm (step 212). Thus, at 214, the method 200 includes comparing the primary and secondary rankings to determine whether to provide the upgrade to the additional wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for optimizing power output of a wind farm having a plurality of wind turbines, each wind turbine having a load sensor, the method comprising;
   estimate, using a farm controller of the wind farm, one or more baseline loading conditions based on measurements from the load sensor for each wind turbine of the plurality of wind turbines of the wind farm by using a data-driven model, wherein the load sensor determines mechanical load on a wind turbine component and wherein the one or more baseline loading conditions indicate baseline mechanical load for the wind turbine component;
   define, using the farm controller of the wind farm, a baseline threshold value for each load sensor for each of the plurality of wind turbines of the wind farm;
   identify, using the farm controller of the wind farm, a test wind turbine having its respective load sensor operating below the baseline threshold value determined using the data-driven model;
   provide, using the farm controller of the wind farm, an upgrade to the test wind turbine; and
   determine, using the farm controller of the wind farm, whether the load sensor of the test wind turbine continues to operate below the baseline threshold value in response to the upgrade by using a physics-based model, and if so,
   1) assign a primary ranking to the load se or of the test wind turbine using the data-driven model:, 2) assign a secondary ranking: to the load sensor of an additional wind turbine of the wind farm using the data-driven model
3) compare the primary ranking and the secondary ranking; and
4) provide the upgrade to the additional wind turbine if the secondary ranking is greater than or equal to the primary ranking.

2. The method of claim 1, further comprising the step of withholding the upgrade to the additional wind turbine if the secondary ranking is less than the primary ranking even if the load sensor of the test wind turbine continues to operate below the baseline threshold value after receiving the upgrade.

3. The method of claim 2, further comprising the step of providing the upgrade to a different test wind turbine in the wind farm if the load sensor of the test wind turbine does not operate below the baseline threshold value after receiving the upgrade.

4. The method of claim 3, further comprising the step of determining a plurality of upgrade configurations for the wind farm based on a comparison between the primary ranking and one or more secondary rankings, wherein each of the upgrade configurations comprises a different selection of wind turbines within the wind farm that are capable of receiving the upgrade.

5. The method of claim 4, further comprising the step of ranking the plurality of upgrade configurations by Annual Energy Production (AEP) gains and operating the wind farm based on the upgrade configuration with a highest AEP gain.

6. The method of claim 1, wherein the upgrade comprises a software update, an indication for hardware update, one or more rotorblade add-ons, or a combination thereof.

7. The method of claim 1, further comprising the step of updating upper and lower limits for the load sensor of the test wind turbine after providing the upgrade to the test wind turbine.

8. The method of claim 1, wherein the one or more baseline loading conditions are estimated by utilizing one or more look-up tables containing pre-existing wind turbine data or calculating the baseline loading conditions via a computer model, wherein the computer model calculates the one or more baseline loading conditions by utilizing one or more of the following: a plurality of equations, one or more aerodynamic performance maps, or one or more look-up tables, and wherein the pre-existing wind turbine data further comprises: a pitch angle, generator speed, power output, torque output, air density, temperature, pressure, wind speed, wind peaks, wind turbulence, wind shear, or wind direction.

9. The method of claim 1, wherein the load sensor comprises an accelerometer, a strain gauge, a pressure sensor, a vibration sensor, a Miniature Inertial Measurement Unit (MIMU), a camera system, a Sonic Detection and Ranging (SODAR) sensor, a Light Detecting and Ranging (LIDAR) sensor, or any combination thereof.

10. The method of claim 1, wherein the baseline loading conditions reflect a loading acting on a rotor blade, a rotor, a hub, a bedplate, a main frame, a generator frame, a pitch hearing, a yaw bearing, a gearbox, a nacelle, a main shaft, a generator, a tower of the wind turbine, or any combination thereof.

11. A method for optimizing power output of a wind farm having a plurality of wind turbines, each wind turbine having a load sensor, the method comprising:
estimating, using a farm controller of the wind farm, one or more baseline loading conditions based on measurements from the load sensor for each wind turbine of the plurality of wind turbines of the plurality of wind turbines of the wind farm by using a data-driven model, wherein the load sensor determines mechanical load on a wind turbine component and wherein the one or more baseline loadine conditions indicate baseline mechanical load for the wind turbine component;
identifying, using the farm controller of the wind farm, a test wind turbine in the wind farm;
defining, using the farm controller of the wind farm, a baseline threshold value for the load sensor of the test wind turbine by using a data-driven model;
providing, using the farm controller of the wind farm, an upgrade to the test wind turbine;
determining, using the farm controller of the wind farm, whether one or more loading conditions of the test wind turbine are below the baseline threshold value;
assigning, using the farm controller of the wind farm, a primary ranking to the load sensor of the test wind turbine;
assigning, using the farm controller of the wind farm, a secondary ranking to the load sensor of an additional wind turbine in the wind farm; and,
comparing, using the farm controller of the wind farm, the primary ranking and the secondary ranking;
providing the upgrade to the additional wind turbine if the secondary ranking is greater than or equal to the primary ranking; and
withholding the upgrade to the additional wind turbine if the secondary ranking is less than the primary ranking.

12. The method of claim 11, further comprising the step of providing the upgrade to a different test wind turbine in the wind farm if the load sensor of the test wind turbine does not operate below the baseline threshold value after receiving the upgrade.

13. The method of claim 12, further comprising the step of determining a plurality of upgrade configurations for the wind farm based on a comparison between the primary ranking and one or more secondary rankings, wherein each of the upgrade configurations comprises a different selection of wind turbines within the wind farm that are capable of receiving the upgrade.

14. The method of claim 13, further comprising the step of ranking the plurality of upgrade configurations by Annual Energy Production (AEP) gains and operating the wind farm based on the upgrade configuration with a highest AEP gain.

15. The method of claim 11, wherein the upgrade comprises a software update, an indication for hardware update, one or more rotorblade add-ons, or a combination thereof.

16. The method of claim 11, further comprising the step of updating upper and lower limits for the load sensor of the test wind turbine after providing the upgrade to the test wind turbine.

17. The method of claim 11, wherein the one or more baseline loading conditions are estimated by utilizing one or more look-up tables containing pre-existing wind turbine data or calculating the baseline loading, conditions via a computer model, wherein the computer model calculates the one or more baseline loading conditions by utilizing one or more of the following: a plurality of equations, one or more aerodynamic performance maps, or one or more look-up tables, and wherein the pre-existing wind turbine data further comprises: a pitch angle, generator speed, power output, torque output, air density, temperature, pressure, wind speed, wind peaks, wind turbulence, wind shear, or wind direction.

18. The method of claim 11, Wherein the load sensor comprises an accelerometer, a strain gauge, a pressure sensor, a vibration sensor, a Miniature Inertial Measurement Unit (MIMU), a camera system, a Sonic Detection and Ranging (SODAR) sensor, a Light Detecting and Ranging (LIDAR) sensor, or any combination thereof.

19. The method of claim 11, wherein the baseline loading conditions reflect a loading acting on a rotor blade, a rotor, a hub, a bed plate, a main frame, a generator frame, a pitch bearing, a yaw bearing, a gearbox, a nacelle, a main shaft, a generator, a tower of the wind turbine, or any combination thereof.

20. A system for optimizing power output of a wind farm, the system comprising:
  a plurality of wind turbines, each wind turbine having a load sensor configured to monitor one or more mechanical loads acting on a respective wind turbine; and
  a farm controller configured to:
    estimate one or more baseline loading conditions based on measurements from the load sensor of each wind turbine of the plurality of wind turbines of the wind farm using a data-driven model, wherein the one or more baseline loading conditions indicate baseline mechanical load for the wind turbine component;
    define a baseline threshold value for each load sensor for each of the plurality of wind turbines of the wind farm;
    identify a test wind turbine having its respective load sensor operating below the baseline threshold value estimated using the data-driven model;
    provide an upgrade to the test wind turbine; and
    determine whether the load sensor of the test wind turbine continues to operate below the baseline threshold value in response to the upgrade using a physics-based model, and if so,
      1) assign a primary ranking to the load sensor of the test wind turbine using the data-driven model;
      2) assign a secondary ranking to the load sensor of an additional wind turbine of the wind farm using the data-driven model;
      3) compare the primary ranting and the secondary ranking; and
      4) provide the upgrade to the additional wind turbine if the secondary ranking is greater than or equal to the primary ranking.

21. The system of claim 20, wherein the farm controller is configured to withhold the upgrade to the additional wind turbine if the secondary ranking is less than the primary ranking and the load sensor of the identified wind turbine continues to operate below the baseline threshold value after receiving the upgrade.

* * * * *